United States Patent [19]

Nöhren et al.

[11] Patent Number: 5,090,641
[45] Date of Patent: Feb. 25, 1992

[54] CASING FOR A PARACHUTE

[75] Inventors: Hubert Nöhren, Hamburg; Werner Moritzen, Elmshorn; Gerhard Siebrand, Quickborn; Helmut Knofe, Norderstedt, all of Fed. Rep. of Germany

[73] Assignee: Autoflug GmbH & Co., Rellingen, Fed. Rep. of Germany

[21] Appl. No.: 463,615

[22] Filed: Jan. 11, 1990

[30] Foreign Application Priority Data

Jan. 11, 1989 [DE] Fed. Rep. of Germany ....... 3900621

[51] Int. Cl.⁵ ...................... B64D 17/50; B64D 17/40
[52] U.S. Cl. ...................................................... 244/148
[58] Field of Search ......................................... 244/148

[56] References Cited

U.S. PATENT DOCUMENTS

| 1,444,369 | 2/1923 | Coughlin | 244/148 |
| 1,603,648 | 10/1926 | Thörnblad | 244/148 |
| 2,383,293 | 8/1945 | Dearstyne et al. | 244/148 |
| 2,467,024 | 4/1949 | Frieder et al. | 244/148 |
| 2,495,341 | 1/1950 | Moran | 244/148 |
| 2,760,741 | 8/1956 | Tauty | 244/148 |

FOREIGN PATENT DOCUMENTS 367327 5/1921 Fed. Rep. of Germany ...... 244/148

Primary Examiner—Joseph F. Peters, Jr.
Assistant Examiner—Anne E. Bidwell
Attorney, Agent, or Firm—Robert W. Becker & Associates

[57] ABSTRACT

A casing for parachutes adapted to set down a load, said parachutes having a parachute canopy, shroud lines, and a carrying harness attached thereto for the load. To simplify manufacture and shorten packing time, and to make it particularly suitable for accommodating a parachute that is adapted to set down a rapidly rotating load, the casing comprises at least two substantially flat fabric sections (11, 12) arranged one above the other and joined together at their outer edges by an encircling seam (14), with one fabric section having a central opening (17).

18 Claims, 2 Drawing Sheets

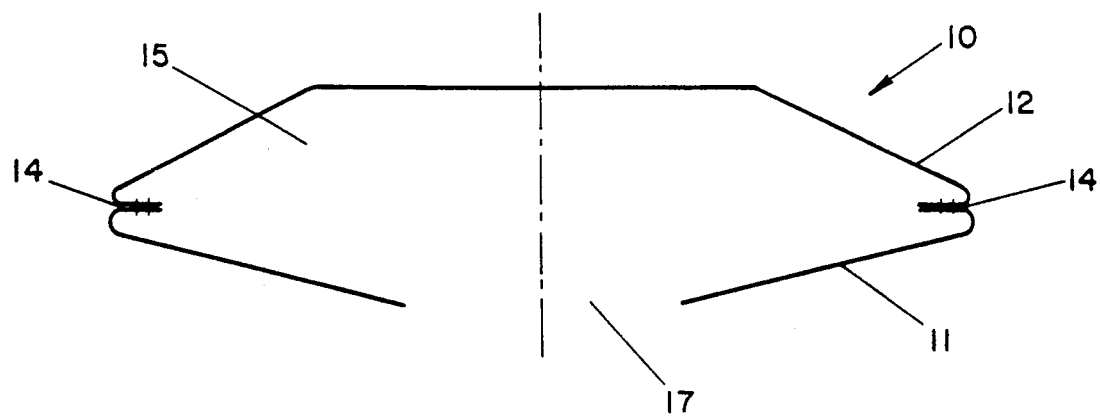
FIG—1
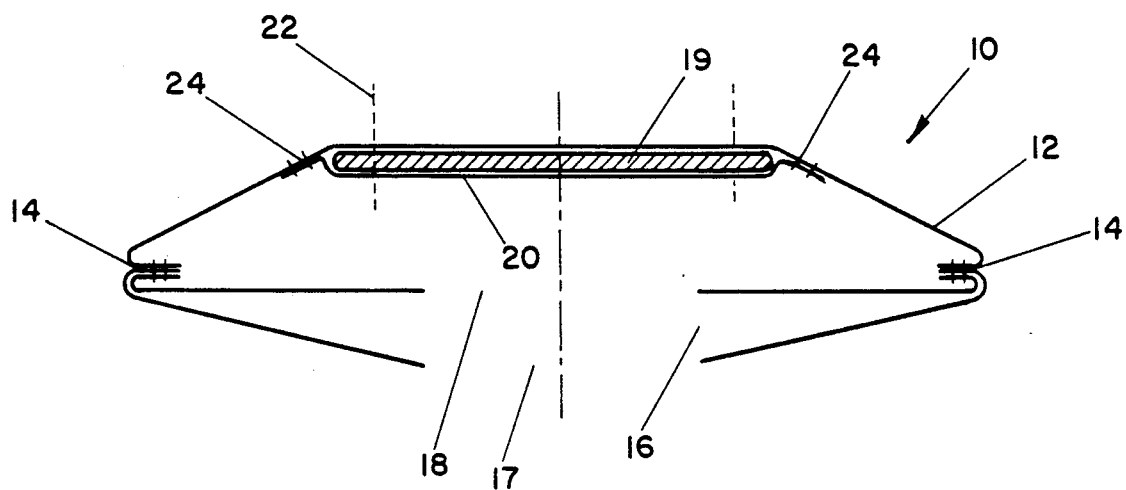
FIG—2
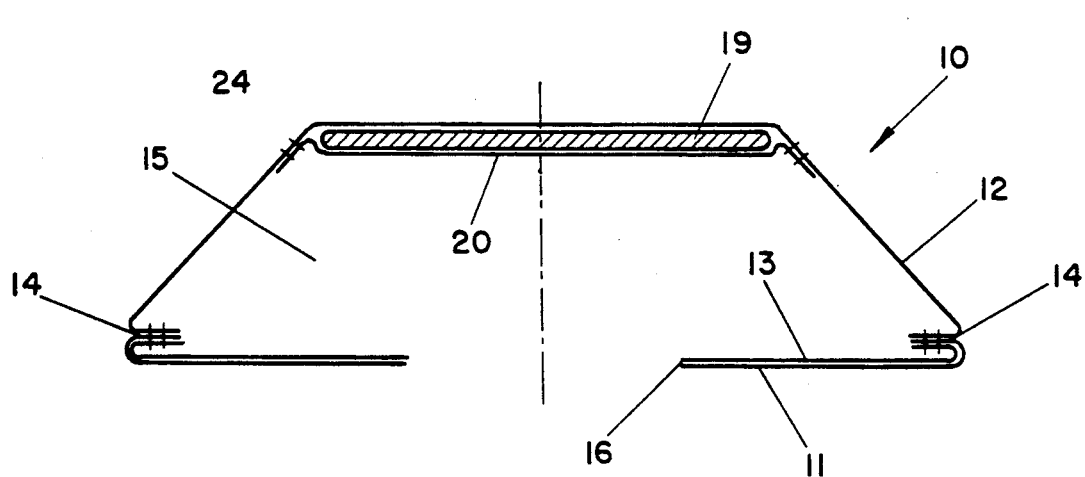
FIG—3

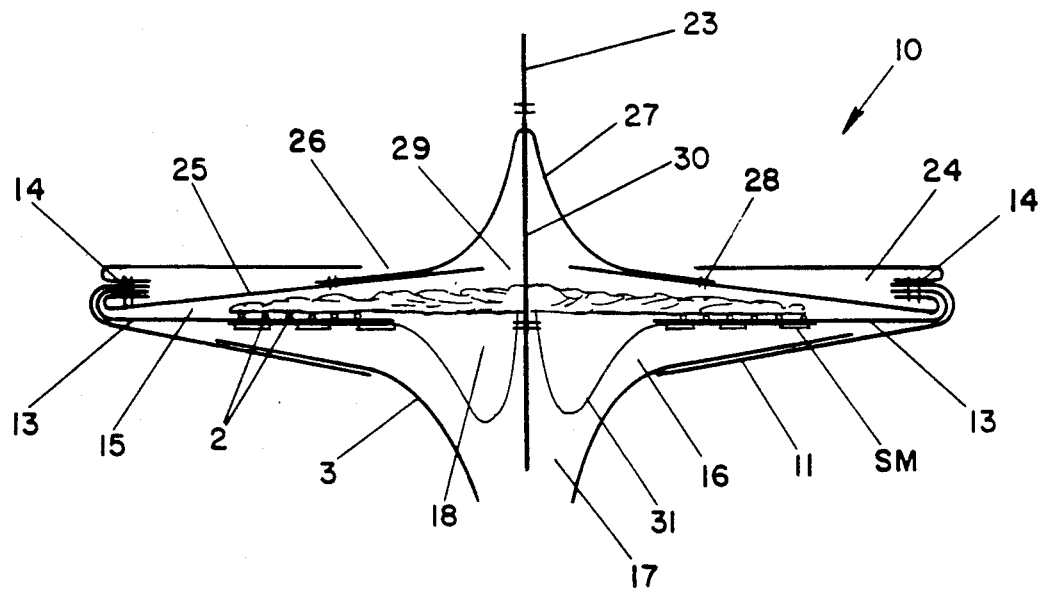
FIG—4
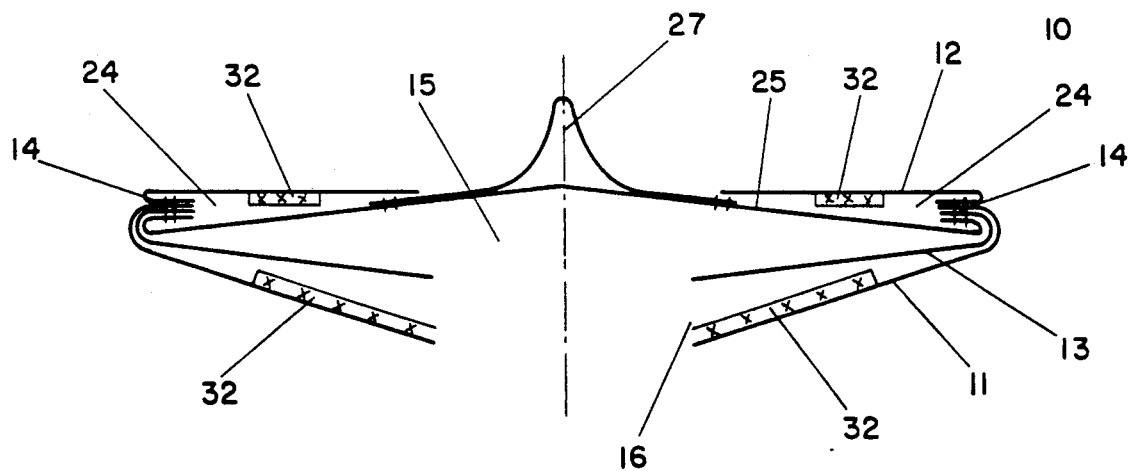
FIG—5

CASING FOR A PARACHUTE

BACKGROUND OF THE INVENTION

This invention relates to a casing or packing bag for a parachute that is adapted to set down a load, such a parachute having a parachute canopy, shroud lines, and a carrying harness attached thereto for the load.

Conventional casings for parachutes have a fabric section that encloses the parachute canopy, together with the shroud lines and carrying harness, like a pocket, the pocket-like casing being closed, after the parachute has been packed therein, by means of one or more flaps or a similar closure In addition auxiliary means such as loops, etc. are provided for fixing the position of the parachute, particularly with respect to the predetermined course of movement when the parachute is deployed from the casing. In so doing, it is necessary to pull the carrying harness and any activating cord provided out of the otherwise closed casing, these parts generally being connected to the casing by means of additional frangible securing means in order to increase the resistance to deployment.

A known casing has the disadvantage that it is comparatively expensive to manufacture since complicated finishing of the casing is required, especially in the region of the flap closure; furthermore, this known casing requires a comparatively long packing operation for the parachute since on the one hand the parachute, carrying harness, and/or activating cord have to be fixed in position in the casing, and on the other hand, after the parachute has been packed, the casing still has to be closed by means of the flaps or other closure means Finally, the known casing is hardly suitable for a parachute for setting down a rapidly rotating load, since a flap closure is less suitable for withstanding rotational stress during the setting down operation, or else will have to be specially constructed for this purpose It is therefore an object of the present invention to improve a casing of the aforementioned general type in such a way that the manufacture of the casing is simplified and the packing time for the parachute is reduced.

SUMMARY OF THE INVENTION

This object, and other objects and advantages of the present invention, will appear more clearly from the following specification in conjunction with the accompanying drawings.

The invention starts from the basic concept that at least two flat fabric sections are provided that are arranged one above the other and are joined at their outer edges by means of an encircling seam with one fabric section having a central opening. This has the major advantage that there is no need for the usual flaps or other closure means; pursuant to the present invention, the parachute with its shroud lines need only be pushed through the central opening in the fabric section and into the interior of the chamber formed by the fabric sections and adapted to receive the parachute; the support harness can also be looped in the chamber formed by the fabric sections and can be passed outwards with its attachment through the central opening. With the inventive casing configuration, the packing time for the parachute is reduced to a remarkable degree because there is no need to close the casing. A further advantage is the simplicity of manufacture of the casing, pursuant to which the fabric sections required to form the casing are placed one above the other and are joined together "from the wrong side", i.e. on the inside, with a single encircling seam, after which the casing according to the invention is formed by turning the fabric sections inside out, so that the joining seam ends up on the inside of the casing.

The inventive casing is advantageously suitable for packing parachutes which are intended to set down a rapidly rotating load. For this purpose it is proposed in one preferred embodiment that the fabric sections be rotationally symmetrical with respect to a central axis located perpendicularly thereon, and be stitched together at their periphery by means of a continuous seam. The particular advantage obtained is that, as a result of the rotary movement of the casing which initially occurs, the parachute together with the support harness is pressed outwardly against the fabric sections, so as to produce a correspondingly higher deployment resistance: consequently the additional measures to increase the deployment resistance which are required with known casings are no longer necessary. There is also the advantage that the rotary movement of the casing produces a defined position for the parachute as well as the carrying harness at the start of the movement of deployment whereby additionally there is no need for the opening of any closure with the possible risk of problems with the deployment operations, since the parachute as well as the carrying harness are pulled out of the chamber only through the central opening in the fabric section.

According to one embodiment of the invention, two chambers are provided for receiving the parachute on the one hand and the carrying harness on the other hand, these chambers being formed by three fabric sections arranged one above the other and stitched together. In this embodiment an outer and an inner fabric section each have a central opening, so that the parachute can be placed in the inner chamber and the carrying harness in the outer chamber through these central openings, and the same can be deployed again by the same route.

Where an additional activating cord is to be accommodated in the casing, according to another embodiment of the invention a third chamber, in which the activating cord can be stowed, can be formed simply by adding a fourth fabric section and stitching all four fabric sections together.

The chambers for receiving the parachute, the carrying harness, or an activating cord may be made with different dimensions, according to the space required, if the fabric sections which form the chamber in question are conical in shape. Pursuant to the invention, this conical shape can be achieved by means of tucks provided in the substantially flat fabric section, or by cutting up the flat section, overlapping the parts in question, and restitching Another possibility is to make the fabric section conical in shape by suitable cutting of the fabric blank.

According to additional embodiments of the invention, the deployment resistance of the carrying harness and/or activating cord can be increased by providing, on the inside of the fabric sections which form the chambers in question, a lining of a friction-increasing material, which is expediently flexible to impart sufficient movement to the casing when the parachute is packed therein and deployed therefrom; another possibility is to insert suitably preformed parts made of friction-increasing and preferably flexible material in the chambers formed by stitching the sections If an activating cord is attached to the casing, the activating cord may be attached to one of the inner fabric sections; alternatively, a loop may be stitched to one of the inner fabric sections, with the end of the activating cord passing through said loop.

Although the fabric section that separates the chamber for receiving the activating cord from the chamber for receiving the parachute need not have an opening, according to one embodiment of the invention an opening may be provided herein, through which an extension cord starting from the activating cord is passed, to which strips are connected which are adapted for the attachment of frangible securing means or safety means via which the carrying harness is fixed in position in the outer chamber assigned thereto. When the casing is stretched the frangible means are broken and both the activating cord and the carrying harness are released for deployment.

According to a preferred embodiment of the invention, the individual fabric sections are rotationally symmetrical, i.e. are circular in construction and are stitched together around their outer circumference in the manner described, so as to produce a circular casing in which the central openings are arranged concentrically. When a rapidly rotating load is to be set down this has the advantage that the activating cord, parachute together with shroud lines, and carrying harness are uniformly pressed outwardly against the seams, which are designed to absorb such stresses.

BRIEF DESCRIPTION OF THE DRAWINGS

Some embodiments of the invention will now described by way of example and with reference to the accompanying drawings, in which:

FIG. 1 shows a casing with two fabric sections, in a diagrammatic view,

FIG. 2 shows a casing with three fabric sections, in a diagrammatic view,

FIG. 3 is a view similar to FIG. 2, but of a different embodiment,

FIG. 4 shows an embodiment by way of example of the casing with four fabric sections, in a diagrammatic view, FIG. 5 shows the embodiment of FIG. 4 in a modified form.

DESCRIPTION OF PREFERRED EMBODIMENTS

The packing bag or casing 10 shown in FIG. 1 consists of two fabric sections 11, 12 that are continuously stitched together at their outer edges by a single seam 14 on the inside, the configuration shown in FIG. 1 being produced by stitching the fabric sections together simultaneously inside out, i.e. on the so-called wrong side, and then turning them the right way out to achieve the form shown. The rotationally symmetrical fabric section 11 has a concentric central opening 17. This arrangement produces a chamber 15 in which is placed a parachute (not shown) with its shroud lines and a carrying harness (not shown). The parachute and carrying harness are both packed in through the central opening 17 and are also deployed through it.

FIG. 2 shows a casing 10 with two externally arranged fabric sections 11, 12 and a fabric section 13 disposed between them; the rotationally symmetrically formed sections 11, 12, 13 are stitched together along their outer edges by means of a continuous single seam 14 on the inside thereof, as described for the embodiment of FIG. 1.

The arrangement of the fabric sections 11, 12, 13 produces two chambers 15, 16, whereby in the packed state of the casing 10, a parachute, which is not shown in detail, together with its shroud lines, is folded in the chamber 15, whereas a carrying harness, not shown in detail, for attaching the parachute to the load which is to be set down is looped into the chamber 16. The rotationally symmetrical fabric sections 11 and 13 each have a concentrically arranged central opening 17 and 18, respectively, through which the parachute and carrying harness are both packed and also deployed.

In the embodiments shown in FIGS. 2 and 3, the casing 10 is connected to a fixed component 19 which may, for example, be part of a container (not shown) which receives the casing as well as the load that is to be set down, or may simply be connected to such a container, preferably the base thereof The detachment of the container part or the component 19 connected thereto causes activation of the parachute since the component 19 lags behind the load and, as a result of the stretching of the casing 10, causes deployment of the parachute from the casing 10. In the embodiments shown, the component 19 is secured to the fabric section 12 by enclosing the component 19 in another fabric section 20, which is connected to the fabric section 12 via an encircling seam 21 and encloses and secures the component 19 in a central position therein. In the embodiments shown, connecting means 22 are indicated between the component 19 and a container (not shown).

As can be seen from FIG. 3, the chambers 15, 16 may also be of a different configuration and size, whereby in particular the volume of the chamber 15 that is adapted to receive the parachute is enlarged. For this purpose, the fabric section 12 is produced in a conical shape; it is, however, also possible to achieve a corresponding configuration of the fabric section either by means of tucks or by cutting open the section, then overlapping it and restitching.

FIG. 4 shows an embodiment of the invention in which the casing 10 has means for connection of an activating cord 23, by means of which the parachute is made to open. The casing 10 encloses the parachute 1, the shroud lines 2 and the carrying harness 3. For this purpose, the casing has another chamber 24 formed between an additional inner fabric section 25 and the outer fabric section 12, and into which the activating cord 23 is looped in the packed state. The activating cord 23 is passed outwards through an opening 26 provided in the outer fabric section 12. For attaching the activating cord 23, a belt loop 27 of textile material is provided that is connected to the inner fabric section 25 by seams 28, so that the fabric of the casing is attached to the activating cord 23.

An opening 29 formed in the fabric section 25 enables an extension cord 30 for the activating cord 23 to be passed through, the end of said extension cord having suitable strips 31 attached thereto, which in turn serve as an attachment for frangible securing means or safety means SM, by means of which the carrying harness is fixed in position in the chamber 16. When the parts are stretched relative to one another, the carrying harness and activating cords are accordingly deployed from the casing 10.

Finally, FIG. 5 illustrates, with reference to the embodiment shown in FIG. 4, that special friction-increasing measures can also be provided in order to increase the deployment resistance which is already present in embodiments according to the invention when setting down a rapidly rotating load. As shown in FIG. 5, linings 32 of a friction-increasing, flexible material are provided on the inside of the fabric sections 11, 12 both in the region of the chamber 16 with the carrying harness looped therein, and also in the region of the chamber 24 for the activating cord 23 or loop 27. According to a preferred embodiment, it is also alternatively possible to provide a preformed component of suitable material which has the same effect as the linings 32 shown in FIG. 5.

The features of the subject matter of these papers, namely the specification, the claims, the abstract, and the drawings, can be important both individually as well as in any combination to realize the various embodiments of this invention.

Furthermore, the present invention is, of course, in no way restricted to the specific disclosure of the specification and drawings, but also encompasses any modifications within the scope of the appended claims.

What is claimed is:

1. A casing for a parachute that is intended for setting down a load, with said parachute having a parachute canopy, shroud lines, and a carrying harness attached thereto for the load, said casing comprising:
at least one substantially flat fabric sections that are deposed one above the other and are interconnected at outer edges thereof via an encircling seam, thereby forming between two adjacent ones of said fabric sections a respective chamber, with one outer one and respective interior ones of said fabric sections being provided with a respective central opening through which said parachute is a packed into said respective chambers and through which said parachute is released after actuation, with said central openings of said fabric sections remaining open in a packed state of said parachute.

2. A casing according to claim 1, which includes three of said substantially flat fabric sections, which are disposed one above the other and are interconnected at outer edges thereof via said encircling seam thereby forming between said fabric sections two chambers for accommodating said parachute and shroud lines, and said carrying harness, respectively, with said one outer one and said respective interior one of said fabric sections being provided with said respective central openings.

3. A casing according to claim 1, which includes four of said substantially flat fabric sections, which are disposed one above the other and are interconnected at outer edges thereof via said encircling seam thereby forming between said fabric sections three chambers for accommodating said parachute and shroud lines, said carrying harness, and an activating line, respectively, with said one outer one and said respective interior ones of said fabric sections being provided with said respective central openings.

4. A casing according to claim 1, in which ones of said central openings associated with said parachute and said carrying harness have the same dimensions.

5. A casing according to claim 1, in which at least one of said fabric sections is provided with tucks to produce a conical shape.

6. A casing according to claim 1, in which at least one of said fabric sections is cut and preshaped into a conical configuration.

7. A casing according to claim 1, in which an inner surface of at least one of said fabric sections is provided with a lining of friction-increasing material.

8. A casing according to claim 1, in which appropriately shaped parts of flexible, friction-increasing material are disposed in chambers formed in said casing between said fabric sections thereof.

9. A casing according to claim 1, in which said carrying harness for said load is fixed in position on said fabric section that holds it via safety means.

10. A casing according to claim 1, in which an activating cord is connected via seams to an interior fabric section that forms a chamber for enclosing same in said casing.

11. A casing according to claim 10, in which, for attachment of said activating cord, a loop is stitched to said interior fabric section and can be disposed in said chamber together with said activating cord.

12. A casing according to claim 11, in which said interior fabric sections provided with an opening for the passage of a cord extension to said carrying harness, with strips being attached to said cord extension for the mounting of safety means for fixing the position of said carrying harness.

13. A casing according to claim 1, in which said fabric sections have a rotationally symmetrical configuration and are stitched together at their periphery via a continuous seam.

14. A casing according to claim 1, in which said seam for interconnecting said fabric sections is disposed on an inner surface of said casing facing chambers formed in said casing between said fabric sections thereof.

15. The use of a casing according to claim 1 for a parachute for setting down a rapidly rotating load.

16. A casing according to claim 1, in which two of said substantially flat fabric sections are disposed one above the other and are interconnected at outer edges thereof via an encircling seam, thereby forming between said fabric sections one of said chambers, with said one outer fabric section being provided with said respective central opening.

17. In a casing for a parachute that is intended for setting down a load, with said parachute having a parachute canopy, shroud lines, and a carrying harness attached thereto for the load, whereby said parachute canopy, said shroud lines and said carrying harness are packed separately into different chambers of said casing, the improvement wherein:
said chambers are formed by a plurality of substantially flat fabric sections that are disposed one above the other and are interconnected at outer edges thereof via an encircling seam, thus forming multiple chambers, with one outer and respective interior ones of said fabric sections being provided with a respective central opening, through which opening said parachute is inserted into said chambers of said casing and through which said parachute is released after actuation, with said parachute canopy, said shroud lines and said carrying harness being placed into different ones of said chambers, with said opening in said outer one of said fabric sections remaining open during a packed state of said parachute in said casing.

18. A casing for a parachute that is intended for setting down a load, with said parachute having a parachute canopy, shroud lines, and a carrying harness attached thereto for the load, said casing comprising:

two substantially flat fabric sections that are disposed one above the other and are interconnected at outer edges thereof via an encircling seam, thereby forming between said fabric sections one chamber, with one of said fabric sections being provided with a central opening through which said parachute is packed into said chamber and through which said parachute is released after actuation, with said opening remaining open in a packed state of said parachute.

* * * * *